(12) United States Patent
Prince et al.

(10) Patent No.: US 11,514,722 B2
(45) Date of Patent: Nov. 29, 2022

(54) REAL TIME KINEMATIC ANALYSES OF BODY MOTION

(71) Applicant: Disney Enterprises, Inc., Burbank, CA (US)

(72) Inventors: Kevin John Prince, Brooklyn, NY (US); Carlos Augusto Dietrich, Porto Alegre (BR); Dirk Edward Van Dall, Shelter Island, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/096,441

(22) Filed: Nov. 12, 2020

(65) Prior Publication Data
US 2022/0147737 A1   May 12, 2022

(51) Int. Cl.
| | | |
|---|---|---|
| *G06K 9/00* | (2022.01) | |
| *G06T 7/246* | (2017.01) | |
| *G06K 9/62* | (2022.01) | |
| *G06V 40/20* | (2022.01) | |
| *G06V 20/40* | (2022.01) | |

(52) U.S. Cl.
CPC .......... *G06V 40/28* (2022.01); *G06K 9/6218* (2013.01); *G06T 7/251* (2017.01); *G06V 20/42* (2022.01)

(58) Field of Classification Search
CPC ........ G06V 40/28; G06V 20/42; G06T 7/251; G06K 9/6218
See application file for complete search history.

(56) References Cited

U.S. PATENT DOCUMENTS

| | | | | |
|---|---|---|---|---|
| 2010/0027835 A1* | 2/2010 | Zhang | ................ | G06V 30/1988 382/100 |
| 2019/0366153 A1* | 12/2019 | Zhang | ................ | A63B 24/0062 |

OTHER PUBLICATIONS

Weinland et al.; "A survey of vision-based methods for action representation, segmentation and recognition"; Computer Vision and Image Understanding; vol. 115; 2011; p. 224-241.
Aggarwal et al.; "Human Motion Analysis: A Review"; Computer Vision and Image Understanding; vol. 73; Mar. 1999; p. 428-440.
Weinland et al.; "Action Recognition using Exemplar-based Embedding"; IEEE Conf. on Computer Vision and Pattern Recognition; 2008; 7 pages.
Nowozin et al.; "Discriminative Subsequence Mining for Action Classification"; IEEE 11$^{th}$ Int'l Conf. on Computer Vision; 2007; 8 pages.
Aristidou et al.; "Deep Motifs and Motion Signatures"; ACM Trans. Graph; vol. 37; Nov. 2018; 13 pages.
Rousseeuw; "Silhouettes: a graphical aid to the interpretation and validation of cluster analysis"; Journal of Computational and Applied Mathematics; vol. 20; 1987; p. 53-65.

\* cited by examiner

*Primary Examiner* — David F Dunphy
(74) *Attorney, Agent, or Firm* — Farjami & Farjami LLP

(57) ABSTRACT

Systems and methods are presented for generating statistics associated with a performance of a participant in an event, wherein pose data associated with the participant, performing in the event, are processed in real time. Pose data associated with the participant may comprise positional data of a skeletal representation of the participant. Actions performed by the participant may be determined based on a comparison of segments of the participant's pose data to motion patterns associated with actions of interests.

20 Claims, 10 Drawing Sheets

100

300

600

700

800

900

1000

REAL TIME KINEMATIC ANALYSES OF BODY MOTION

BACKGROUND

Professional games, such as combat sports, generate an abundance of information that is hard for viewers to follow and appreciate in real time. For example, in a boxing match, the occurrence of a play action carried out by a player (such as a jab, a cross, an undercut, or a hook) as well as the play action's forcefulness and effectiveness may be hard for a viewer to immediately recognize and quantify by mere visual inspection of the player's performance during the game. Likewise, comparative and cumulative analyses of the movements of performing participants during a live event cannot be accomplished without an automated system. Analyses of the live event's video to detect and to measure the participants' performances, can facilitate statistics in real time. In a sporting event, for example, game statistics, generated as the game unfolds, may support commentary and may provide insights into the development of the game by intuitive visualization of the game statistics.

Analyzing a live event to detect play actions performed by participants of the event requires techniques for real time detection of actions of interest, employable on video feeds that capture the live event. Various action recognition techniques have been proposed for applications such as human-machine interfaces, video indexing and retrieval, video surveillance, and robotics, for example. However, detecting play actions in real time, that by their nature are of high motion and spatiotemporally variant and complex, calls for techniques that are efficient and capable of dynamically updating a database of learned actions of interest used for recognition of the actions to be detected.

DETAILED DESCRIPTION

Figure 1:
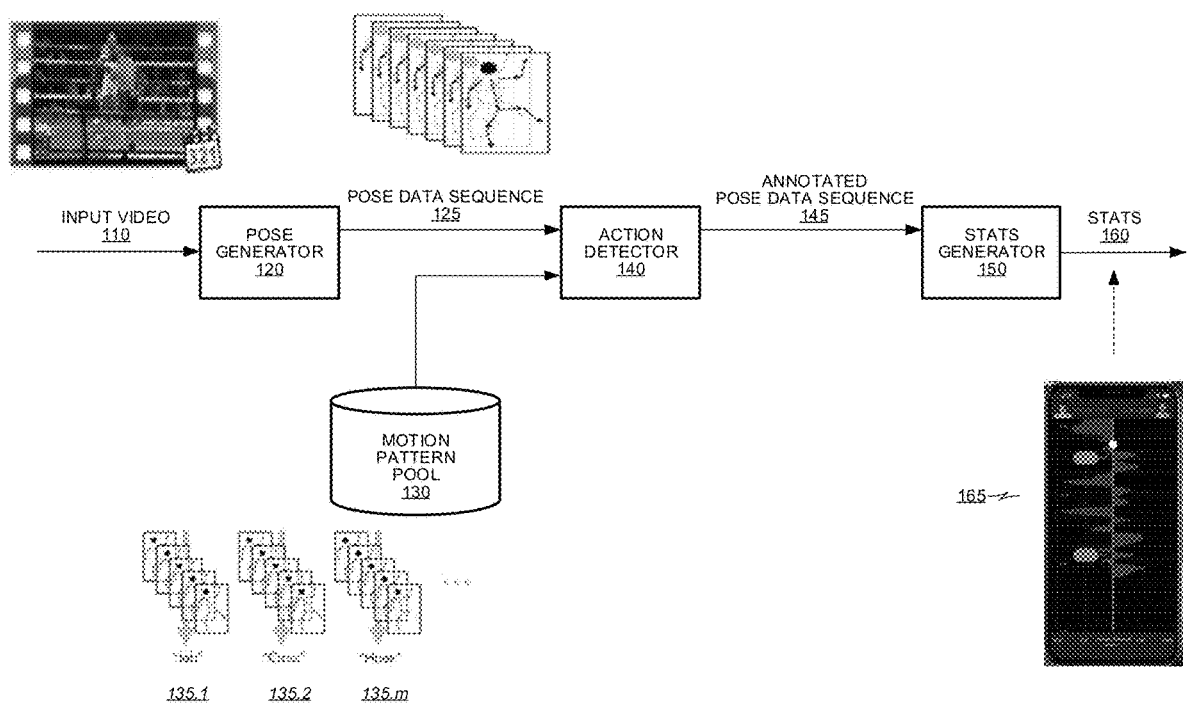
FIG. 1 illustrates a system for generating game statistics, according to an aspect of the present disclosure.

Systems and methods are disclosed for generating statistics from a video of an event, such as a sporting event, a game, a competition, a match, or the like. The video may be of a live event or a recorded event. For purposes of illustration only, aspects of the present disclosure are described with respect to a boxing match, however, aspects disclosed herein are not so limited. The methods and systems described below are applicable to other sports and arts, wherein statistics related to actions performed by participants of the sports or the arts may be generated and may be used to highlight the participants' performances.

Systems and methods are described herein for generating statistics, wherein sequences of pose data corresponding to participants (e.g., players) performing in an event (e.g., a game), may be processed in real time. Each sequence of pose data may comprise positional data of a skeletal representation of a respective participant. Techniques disclosed herein may be employed to detect actions performed by participants based on their respective pose data sequences. In an aspect, a participant's action during an event may be detected by extracting a segment from a respective pose data sequence and by comparing the extracted segment to one or more motion patterns, each of which may be associated with an action of interest. A participant's action may be detected if a match is found between the extracted segment and at least one motion pattern out of the one or more motion patterns the segment is compared to, wherein the detected action is an action of interest associated with the at least one matching motion pattern. By comparing a segment of pose data to a motion pattern, representative of a play action, both temporal and spatial characteristics of the action are captured.

Participants' pose data sequences may be used to generate statistics with reference to pose data leading to detected actions. In an aspect, a pressure statistic may be computed that measures movements of one participant (e.g., a player) toward another participant (e.g., the player's opponent) based on their respective pose data sequences. In another aspect, a power statistic may be computed that measures the energy exerted by a participant—e.g., kinetic energy that may be generated by one of the joints of a participant. In yet another aspect, an aggressiveness statistic may be computed that may be derived from the kinetic energy generated by a dominant arm and the kinetic energy generated by a leading arm of a participant. Alternatively, an aggressiveness statistic may be derived based on the number of detected actions performed by a participant and the kinetic energies associated with those actions. Furthermore, sustained injuries to a participant may be visualized by a heat map that may build up as the event progresses. To that end, collisions (physical contacts) endured by a participant are detected. The locations and the intensities of the detected collisions may be accumulated to provide a measure of that participant's sustained injuries.

FIG. 1 illustrates a system 100 for generating game statistics, according to an aspect of the present disclosure. The system 100 may comprise a pose generator 120, a motion pattern pool 130, an action detector 140, and a statistics (stats) generator 150. The pose generator 120 may receive, as an input, one or more video streams 110 that may be captured by a camera system that comprises multiple video cameras located at a scene of a sporting event. The pose generator 120 may output one or more sequences of pose data 125, each corresponding to a player (or other participant), performing (or present) at the scene of the sporting event. The action detector 140 may process segments that may be extracted from a received sequence of pose data 125, to carry out detection of play actions, represented by respective segments. A detection 140 that a play action was carried out by a respective player—i.e., a detection that an extracted segment is representative of a play action—may be based on comparisons of the segment to motion patterns 135 that may be stored in the motion pattern pool 130. Upon detection that an extracted segment is representative of a play action, the action detector 140 may annotate the pose data sequence 125 based on the detected action and may output the annotated pose data sequence 145 to the stats generator 150. Hence, the action detector 140, by virtue of detecting a play action of interest from an extracted segment, performs temporal segmentation of the input video 110—i.e., the detector 140 detects the segment of the video that contains the detected action. This detected segment may be indicated by annotating the pose data sequence 145. For example, the annotated pose data sequence 145 may include marks of the beginning and the end of the detected action. The stats generator 150 may process the annotated pose data sequence 145 and may generate stats 160, measuring various aspects of the respective player's performance relative to the annotations of the detected play actions.

Figure 2:
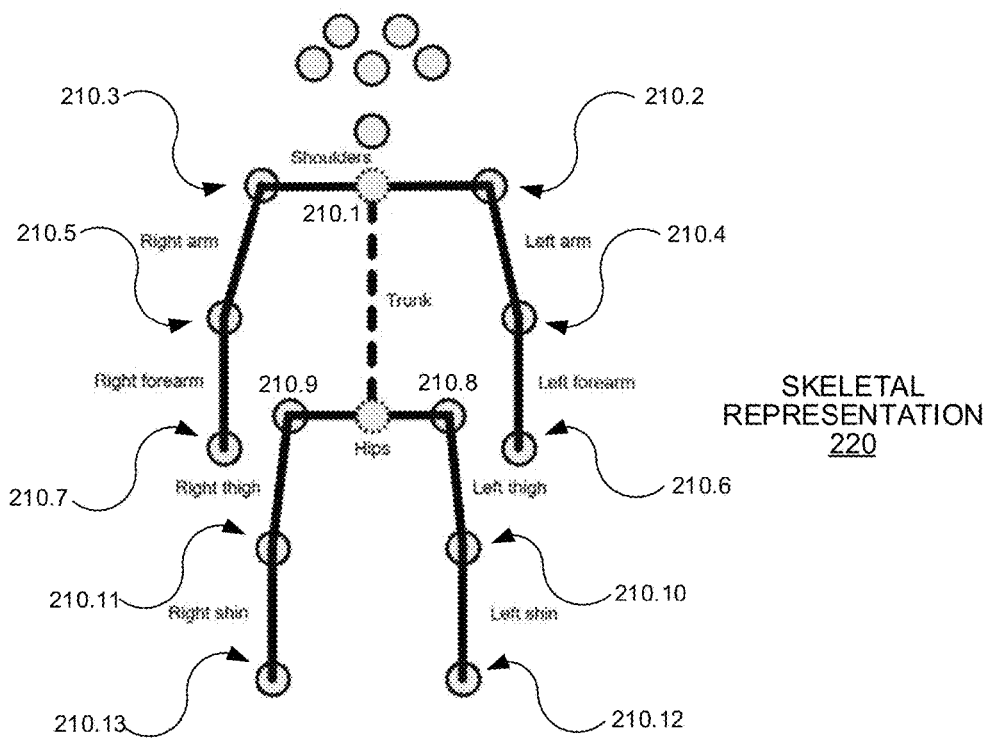
FIG. 2 illustrates a sequence of pose data of a skeletal representation, according to an aspect of the present disclosure.

In an aspect, one or more video streams 110, capturing a live sporting event, may be fed to and buffered by the pose generator 120. The pose generator may employ techniques for extracting pose data 125 from frames of video streams 110 and may output the pose data 125. FIG. 2 illustrates a pose data sequence 230 of a skeletal representation 220, according to an aspect of the present disclosure. The pose data sequence 125 may comprise positional data of key points 210 associated with a skeletal representation 220 of a performing player across time. As illustrated in FIG. 2, key points may correspond to body joints 210.1-210.13 that connect bone (or body) sections, such as, the left/right shoulder, the left/right arm, the left/right forearm, the trunk, the hips, the left/right thigh, and the left/right shin. For example, joints (used as key points) may be the left/right shoulder 210.2/210.3, the left/right elbow 210.4/210.5, the left/right wrist 210.6/210.7, the left/right hip 210.8/210.9, the left/right knee 210.10/201.11, and the left/right ankle 210.12/201.13.

The three dimensional (3D) positions of key-points of a player at the scene may be computed in real time using sensor-based techniques, vision-based techniques, or a combination thereof. Where sensor-based techniques are utilized, a real world 3D location of a key point may be computed by a real time localization system (RTLS). In this case, for example, a 3D location of a key point may be derived based on triangulation of data measured from a transceiver (e.g., attached to a joint 210.1-210.13) and readers. Where vision-based techniques are utilized, one or more cameras may be positioned at the scene of a live sporting event. The cameras may be calibrated to allow for association of a real-world 3D location of a key point to its image projection, i.e., the respective two dimensional (2D) pixel locations at the video frames. Typically, image recognition methods may be employed to identify an image region of a joint, and, then, the 3D location of the identified joint may be computed based on the camera's calibration data.

As illustrated in FIG. 2, a pose data sequence 230, generated across time, may comprise a series of 3D positional points associated with a player's key points 210. A positional point is denoted herein by $P_j(t)$, wherein P represents the 3D vector location of a joint j at a time t. In an aspect, $P_j(t)$ is an (x, y, z) vector in a Cartesian coordinate system defined relative to the scene. The time, t, and the rate at which the 3D position of a key point, $P_j(t)$, is computed may correspond to the time and the rate in which video frames 110 may be fed into the system 100. For example, a pose data sequence may provide 90 positional data points for each of the joints 210.1-13 each second, generated from a video with a frame rate of 90 frames per second.

Upon receiving a pose data sequence 125, corresponding to a live video coverage of a sporting event 110, the action detector 140 may detect actions of interest as they are performed by a player (or a participant) in the game. Actions of interest may be recognized as playing movements that are typical of a sport—for example, in boxing, some of the main recognized movements are a jab, a cross, an uppercut, or a hook. In an aspect, the action detector may extract a segment of pose data 240 out of a pose data sequence 230 according to a sliding window; for example, the extracted segment may extend between a current time to and a previous time $t_0$–T. In order to determine whether the extracted segment 240 represents a certain action, the action detector 140 may compare the segment 240 to motion patterns 135 accessible from a motion pattern pool 130. The motion patterns 135, constituting the pool 130, may be initially collected during a learning phase and may be dynamically updated during operation by techniques described herein in reference to FIGS. 7-9. Each motion pattern, e.g., 135.m, may be associated with pose data (depicting an action of interest) and metadata (including data related to the depicted action of interest). As explained in detail below, the comparisons performed by the action detector 140 may be among features that may be derived from the pose data of the extracted segment 240 and respective pose data of each motion pattern the segment is compared to. Based on these comparisons, once a match is discovered between a segment 240 and a motion pattern, e.g., 135.m, the segment may be determined as representative of the action associated with the matching motion pattern. Consequently, if a segment 240 is found to be representative of an action, e.g. a jab, the pose data sequence 125 may be annotated accordingly—e.g., to indicate the beginning and the end of the detected action within the pose data sequence—and the annotated pose data sequence 145 may be fed into the stats generator 150.

The stats generator 150 may analyze the annotated pose data sequence 145 relative to annotations of respective detected actions. In an aspect, analyses of the annotated pose data sequence 145 may be used to compute statistics that may provide insights with respect to a player's performance and the progression of the game. For example, a pressure statistic may be computed from pose data leading to an annotated action, quantifying the frequency and extent of advances the acting player has made against the opponent. In another example, a power statistic may be computed from pose data leading to an annotated action, quantifying the energy exerted by the acting player based on linear kinetic energy that has been generated by the acting player's movements. Statistics computed from pose data with respect to an annotated action may incorporate previously generated statistics of the same player, of the player's opponent, or both. Similarly, the computed statistics may incorporate statistics generated in other games with respect to the same player, other players, or both. The statistics 160 generated by the stats generator 150 may be presented "as is" or may be translated into a more intuitive visual presentation 165 that may be displayed to a viewer of the game, overlaid either on the viewer's primary display (e.g., TV screen) or a secondary display (e.g., mobile device).

Figure 3:
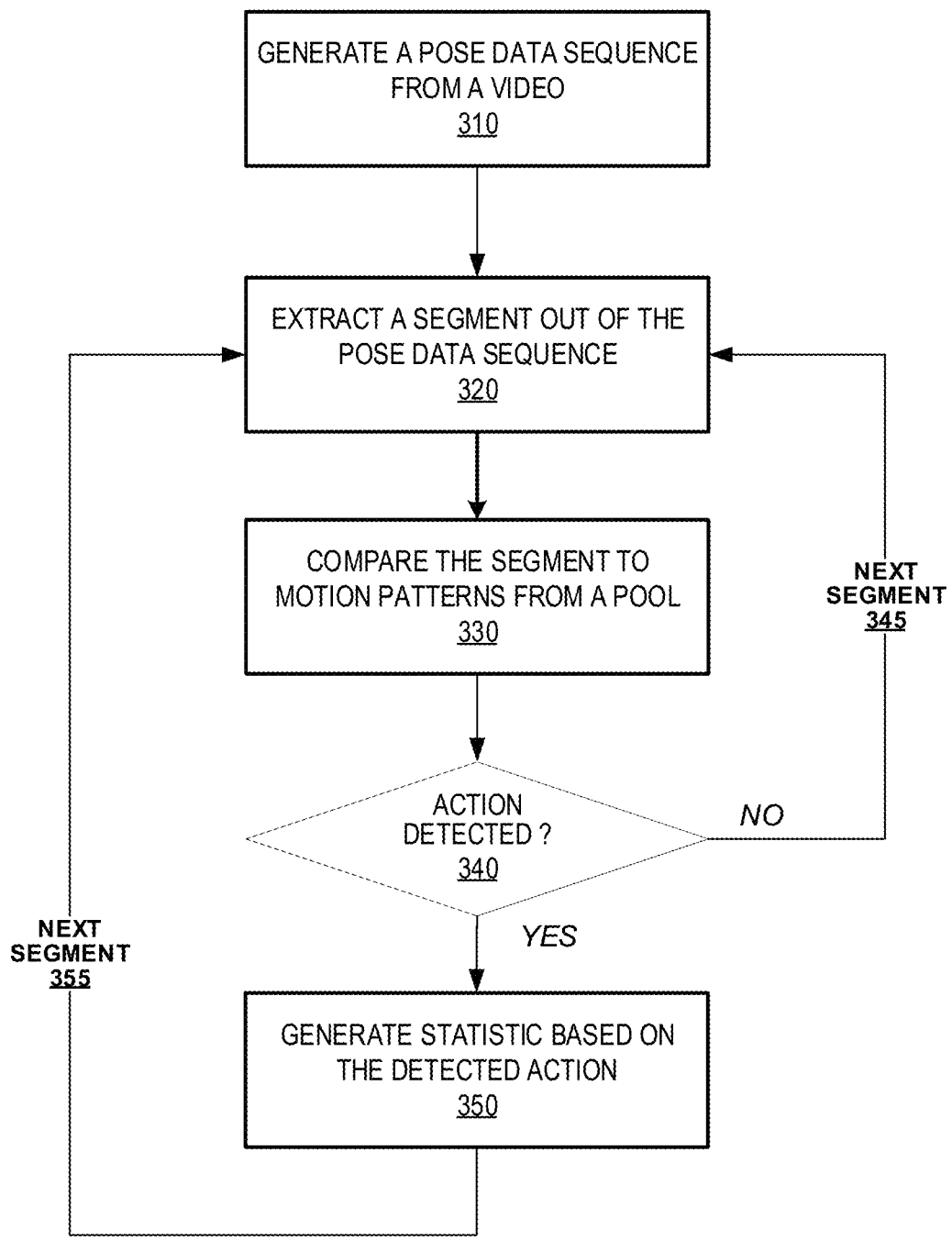
FIG. 3 illustrates a method for generating game statistics, according to an aspect of the present disclosure.

FIG. 3 illustrates a method 300 for generating game statistics, according to an aspect of the present disclosure. The method 300 is described with reference to FIG. 4. The method 300 may begin, in step 310, with generating, in real time, pose data sequences 430, each of which may be associated with a player performing in a live game. In step 320, a segment of pose data 440 may be extracted from a pose data sequence, wherein extraction may be within a sliding window, typically ranging between a current time and a previous time. In step 330, the extracted segment may be compared with motion patterns 135 from the motion pattern pool 130. Based on the comparison, if it is detected that the segment is representative of an action 340, statistics may be generated 350 from the pose data sequence relative to the detected action in step 350, after which a next segment 355 may be extracted from the pose data sequence, in step 320. Otherwise, if no action is detected 340 based on the comparison, no action of interest is associated with that segment, and a next segment 345 may be extracted from the pose data sequence, in step 320.

In step 310, the generated pose data sequence 430 may comprise 3D positions of major joints, 410.1-J, of a player body, e.g., a sequence of positional data $P_{j=1-J}$ (t) may be provided at points in time t associated with frames of the input video 110. In an aspect, more than one sequence of pose data may be generated 310, corresponding to multiple players. For example, two corresponding sequences of pose data 430 may be generated out of the input video 110 with respect to two players in a boxing match, $P_{j,1}$ (t) and $P_{j,2}$ (t), and may be processed 300 independently or in a coupled manner. The generated one or more pose data sequences 310, as well as the input video 110, may be buffered to allow for further access and processing 300.

In step 320, a segment 440 may be extracted from the pose data sequence 430. The segment may be extracted according to a sliding window—that is pose data generated between the current time to and a previous time $t_0-T$ may be extracted to form a segment of length T, denoted herein as $S=S_T(t_0)$, comprising data elements: $P_j$ (t) for j=1 . . . J and for t=$t_0-T$ . . . $t_0$. In an aspect, the length T of the segment 240 may vary based on criteria such as the nature of the performance that is being analyzed (e.g., boxing or other sports) or the processing in steps 330-350 of previously extracted segments 440. Likewise, the rate in which segments 440 may be extracted may vary depending on the nature of the performance that is analyzed (e.g., boxing or other sports) or the processing in steps 330-350 of previously extracted segments 440. For example, a segment may be extracted at the same rate as the input frame rate or at a lower rate. In an aspect, the extraction of a segment from the pose data sequence may be performed at a stride that is determined based on a detected action from a previously extracted segment. For example, if no action has been detected based on the processing of several successive segments or if a game event occurred, the frequency in which upcoming segments are to be extracted may decrease. In an aspect, multiple segments may be extracted at a current time to, at various length T or rates, to reflect possible variance among players that may perform the same action at different speeds, for example. In such a case, detection 330-340 may be applied to each of the extracted multiple segments.

Once a segment 440 is extracted, in step 330, the segment may be compared with motion patterns 135 from the motion pattern pool 130, with the goal of detecting what action, out of the actions of interest represented by the motion patterns 135, the segment S may be representing. For example, the motion pattern pool 130 may comprise motion patterns that are representative of a jab 135.1, a cross 135.2, or a hook 135.m; each of these motion patterns 135.1-m may have a data structure associated with it, comprising pose data representative of an action of interest. Thus, in step 330, the extracted segment S may be found to match motion patterns representing a cross action 135.2 and, therefore, the segment S may be classified as representative of a cross action. When no matching motion pattern for segment S has been found in the motion pattern pool 130, a next segment 345 may be extracted from the pose data sequence 430, in step 320. In an aspect, when no matching motion pattern has been found, the segment S may be further processed to determine whether the segment represents a new action of interest, and, therefore, whether it should be added to the pool 130 as a new motion pattern 135 according to techniques described with reference to FIGS. 7-9.

Figure 4:
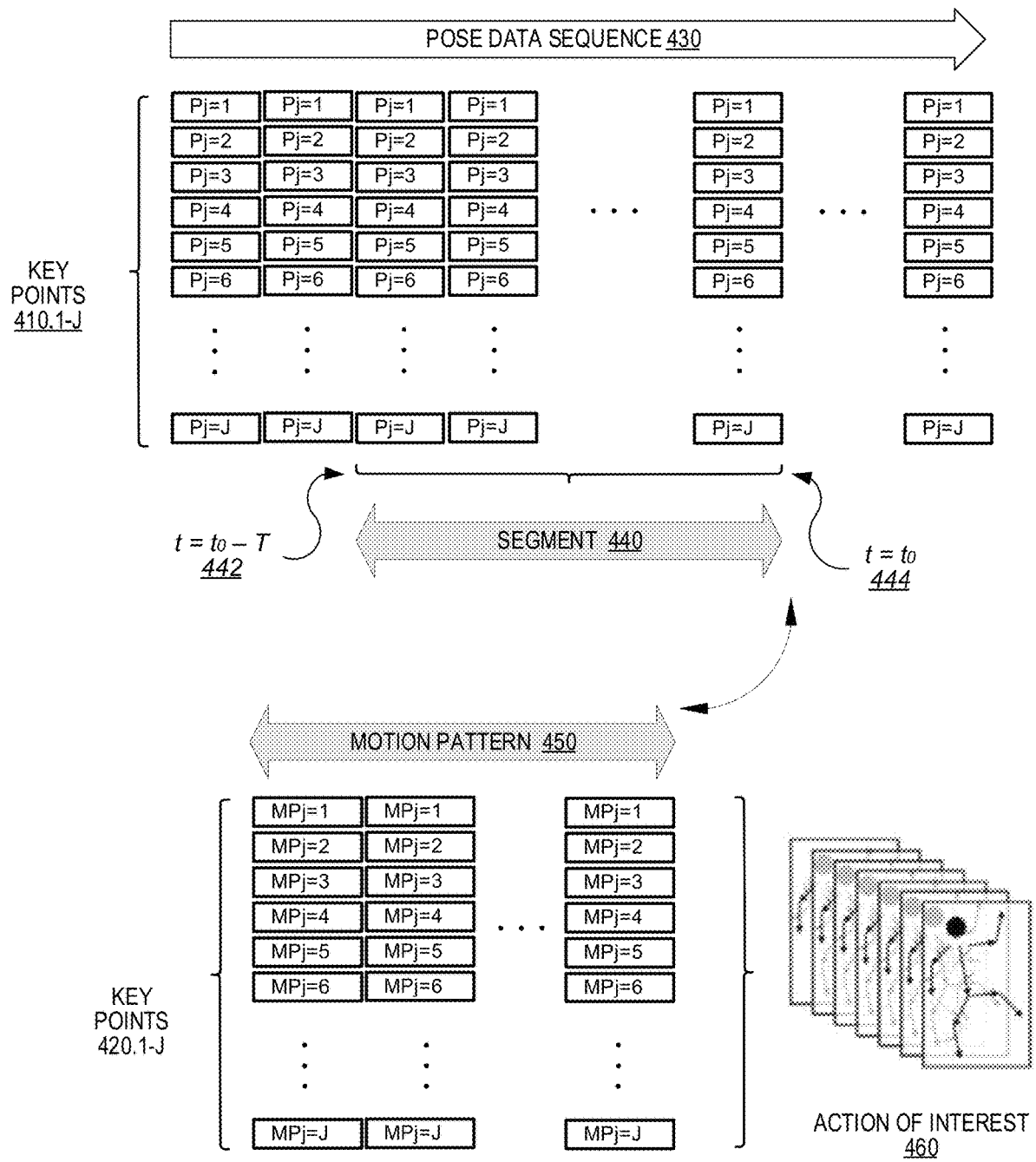
FIG. 4 illustrates a segment of pose data and a motion pattern, according to an aspect of the present disclosure.

FIG. 4 illustrates a segment 440 of a pose data sequence 430 and a motion pattern 450, according to an aspect of the present disclosure. The pose data sequence 430 may be generated by the pose generator 120 of system 100 according to step 310 of method 300. The segment $S=S(t_0)$ 440 may be extracted from the pose data sequence 430 at time $t_0$, comprising positional data of skeletal representation of a performing player along a temporal duration T. Thus, S 440 may comprise a series of positional data elements, as follows:

$$S=\{P_{S,j}(t)=(x_t,y_t,z_t)_j: j=[1,J] \text{ and } t=[t_0-T,t_0]\}, \quad (1)$$

where $(x_t, y_t, z_t)_j$ may denote a location vector of a key point j at a discrete time t within a range of $t_0-T$ 442 and to 444. The location vector may be defined in a Cartesian coordinate system relative to the scene. The segment S 440, as defined in (1), may be compared 330 to a motion pattern MP 450, representative of an action of interest 460 (e.g., a jab). The motion pattern MP 450 may comprise positional data of a skeletal representation of a player performing the action of interest 460 along a temporal duration T Thus, MP may comprise a series of positional data elements, as follows:

$$MP=\{P_{MP,j}(t)=(x_t,y_t,z_t)_j: j=[1,J] \text{ and } t=[0,T]\}, \quad (2)$$

where $(x_t, y_t, z_t)_j$ may denote a location vector of a key point j at a discrete time t within a range of 0 and T The location vector may be defined in a Cartesian coordinate system.

In an aspect, before comparing data elements of an extracted segment S 440 with corresponding data elements of a motion pattern MP 450, in step 330, the data elements may be normalized to account for differences in translation, size, and rotation of the skeletal representations in S and MP. In an aspect, a rigid transformation may be applied to the elements of S440 to spatially align it to corresponding elements of MP 450. The segment S may then be compared to the motion pattern MP it is aligned to. In an aspect, motion patterns 135 may be normalized based on (or aligned to) a reference skeletal representation when added to the pool 130; and, accordingly, each extracted segment S may be normalized based on that same reference skeletal representation before being compared with each motion pattern in the pool.

A comparison between a segment S 440 and a motion pattern MP 450, in step 330, may be performed by computing a distance (or a similarity) metric, measuring the degree of disparity (or similarity) between S and MP. In an aspect, a distance metric of Mean Squared Error (MSE) may be used, as follows:

$$MSE(S, MP) = \frac{1}{NJ}\sum_{n=1}^{N}\sum_{j=1}^{J}\|P_{S,j,n} - P_{MP,j,n}\|^2, \quad (3)$$

where, $P_{S,j,n}$ and $P_{MP,j,n}$ may denote positional data with respect to corresponding joints j and where n may refer to corresponding elements of the S and the MP series (e.g., as defined in (1) and (2), respectively). Thus, S 440 may be classified as representative of an action 460 if a motion pattern 450 that corresponds to this action 460, yields the least MSE value compared with the other motion patterns 135 in the pool 130. In an aspect, S may be classified as representative of an action 460, if the collective distance (or similarity) metric computed based on multiple motion patterns that are associated with the action 460 supports such a conclusion.

In an aspect, the comparison between a segment S 440 and a motion pattern MP 450 may be based on respective features. In such a case, instead of computing a distance or similarity metric between respective positional data, $P_{S,j,n}$ and $P_{MP,j,n}$, a distance or similarity metric may be computed between features that may be derived from the respective positional data, $P_{S,j,n}$ and $P_{MP,j,n}$. For example, a feature corresponding to a joint j, out of the joints recorded in $P_{S,j,n}$ or $P_{MP,j,n}$, may be defined as the angle between the body sections connected by this joint j, namely an angle feature. For example, an angle feature that may be associated with an elbow (e.g., joint 210.4) may be the angle between the respective arm and forearm, as shown in FIG. 2. The angle feature between two connected body sections may be defined as a three dimensional angle (vector). Alternatively, the angle feature may be defined as a planar angle (scalar), measuring the angle between two body sections in the planar space formed by these body sections. Another example is of a distance feature—e.g., a distance between a joint j and a centroid of the joints of an opponent. Angle features are invariant to differences in translation, rotation, and size between pose data of a segment and of the pattern motion it is compared with. While distance features are invariant to differences in rotation and translation, and variant to differences in size. This, however, may be a desirable characteristic of a distance feature, as actors of different sizes may perform the same action at different speeds and a metric that captures it may be desirable under such circumstances.

Any discriminative features may be used to measure the distance or similarity between a segment S 440 and a motion pattern MP 450. For example, the distance may be measured by MSE metric, as follows:

$$MSE(S, MP) = \frac{1}{NJ}\sum_{n=1}^{N}\sum_{j=1}^{J}\|F_{S,j,n} - F_{MP,j,n}\|^2, \quad (4)$$

where, $F_{S,j,n}$ and $F_{MP,j,n}$ may denote features derived from $P_{S,j,n}(x, y, z)$ and $P_{MP,j,n}(x, y, z)$, respectively. Generally, features that are invariant to spatial differences between two players that performed the same action are preferred. For example, using angles as described above may result in features that are invariant to differences—e.g., in dimension, orientation, or translation—in the skeletal representations of S and MP.

In step 350, game statistics may be generated in real time (or with low latency) to provide highlights and to support commentary for viewers of the game. As described above, system 100 may process input video 110 covering a live game, may translate 120 the video content into sequences of pose data 125, each corresponding to a player of the game, and may annotate the pose data sequences with detected actions performed by respective players 140, referencing a motion pattern pool 130. The system 100 may then analyze the annotated pose sequence (the annotations are indicative of the segment of pose data that contains the detected action) relative to the detected actions, generating game statistics 150. The game statistics may be used to present to the viewer the type of action a certain player just performed, whether a player's posture is defensive or offensive and to what degree, and to quantify a player's style. For example, measurements of instantaneous speed and acceleration of competing players may be computed based on the players' respective annotated pose data sequences and may be presented across time using a flow graph showing them side by side during the game.

Figure 5A:
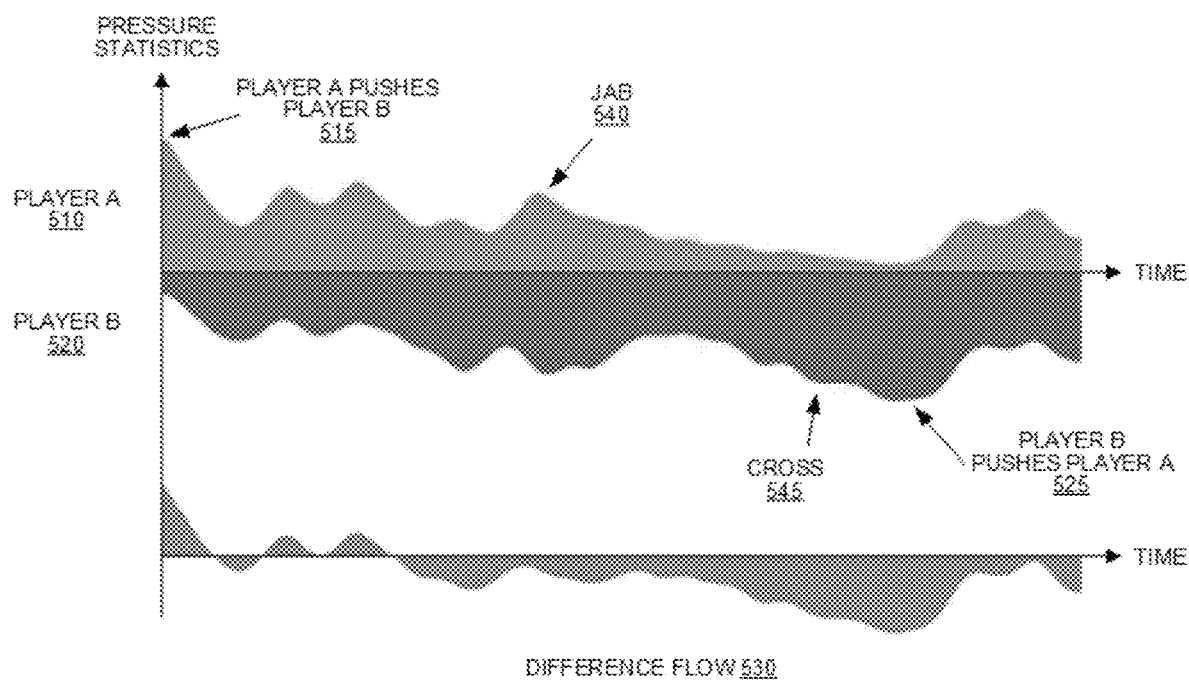
FIG. 5A is a flow presentation of a pressure statistic, according to an aspect of the present disclosure.

FIG. 5A is a flow presentation of a pressure statistic, according to an aspect of the present disclosure. Two flows are shown in FIG. 5A, the flow on the top is of player A 510 and the flow at the bottom is of player B 520. The two flows present pressure statistics concurrently measured based on player A's and player B's movements relative to each other. Pressure statistics may be computed based on the annotated pose data sequence 145 of each player, and may be carried out or emphasized during a time leading to an annotated action detected by the action detector 140 (e.g., a jab 540 or a cross 545). A pressure statistic may quantify the attempts that were made by each player to move forward toward the opponent and to what extent (thereby "pressuring" the opponent 515, 525). In an aspect, a player's pressure statistic may increase when the player's own movement results in the decrease of the distance between him and the opponent, and vice versa. The pressure statistic may be presented in units of distance (e.g., meters, feet) or may be presented in relative terms—the current pressure statistic relative to the pressure statistic accumulated in recent duration (e.g., last 5 seconds or during the game). In another aspect, the difference between the pressure exerted by each player against the opponent may also be measured and presented 530 to quantify a player's relative defensive or offensive playing style.

Figure 5B:
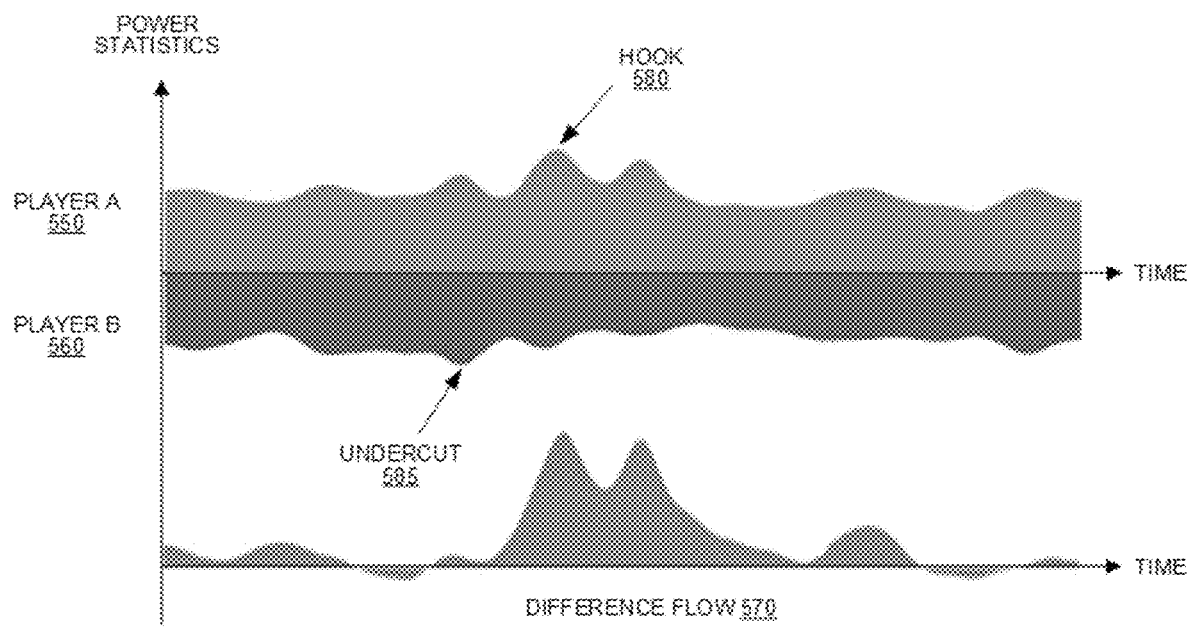
FIG. 5B is a flow presentation of a power statistic, according to an aspect of the present disclosure.

FIG. 5B is a flow presentation of a power statistic, according to an aspect of the present disclosure. Two flows are shown in FIG. 5B, the flow on the top is of player A 550 and the flow at the bottom is of player B 560. The two flows present power statistics concurrently measured based on player A's and player B's movements relative to each other. Power statistics may be derived from each player's annotated pose data sequence 145. Power statistics may quantify the linear kinetic energy generated by a player against the opponent, for example, during a time leading to a detected action (e.g., a hook 580 or an uppercut 585). A linear kinetic energy is defined as $0.5\|mv\|^2$, where m may stand for a player's mass and v may stand for a joint's velocity of the player. Thus, the linear kinetic energy may be computed herein for each pose element $P_j(t)=(x_t, y_t, z_t)$ in the annotated pose data sequence 145, using successive poses to compute v at time t for a joint j. For example, the linear kinetic energy of the wrists 210.6, 210.7 or the feet 210.12, 210.13 may be computed for a duration leading to a detected action, e.g., a hook 580 carried out by player A 550 or an undercut 585 carried out by player B.

The power statistic may be associated with a player's handedness. For example, a player's aggressiveness statistic may be derived from a ratio between the energy generated by the dominant arm and the energy generated by the leading arm. The aggressiveness statistic may be based on assumptions such as: 1) an aggressive player may generate more energy with his dominant arm in an attempt to cause more damage to his opponent; 2) a player that manages to effectively open room for power punches would also have a high value for that ratio; and 3) a player that is failing to open room for power punches or that is trying to be defensive would generate more energy with his leading arm. In an aspect, a player's aggressiveness statistic may be derived from a combination of the number of actions (e.g., punches) and the (kinetic) energy associated with those actions.

Figure 6:
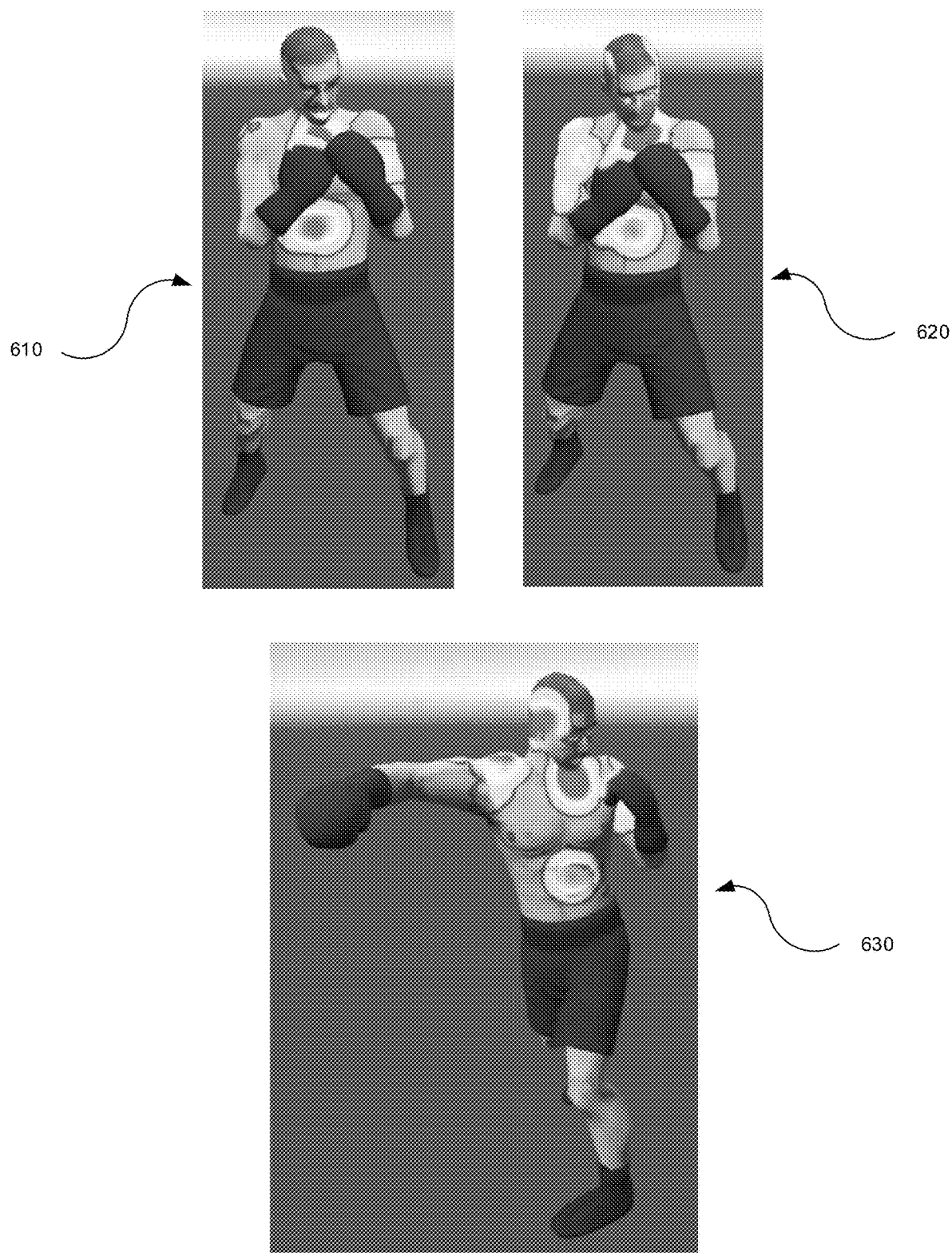
FIG. 6 illustrates heat maps of a player's accumulative injuries, according to an aspect of the present disclosure.

FIG. 6 illustrates heat maps of a player's accumulative injuries, according to an aspect of the present disclosure. In an aspect, collisions that a player's body may endure as a result of the opponent's strikes may be detected and their intensity and distribution on the player's body may be presented during the live game, for example, by a heat map that may be updated over time 610-630. For example, a virtual body surface may be defined relative to a player's skeletal representation (associated with the player's pose data) and each time one of the opponent's joints (e.g., a wrist or a foot) reaches this surface, a collision event may be determined to occur. Thus, based on the annotated pose data sequence 145 generated by the system 100 for each player, for each detected 340 (and annotated) action exerted by the opponent, it may be determined whether a collision event had occurred 350. When a collision event had occurred, the collision's location on the player's virtual body surface may be recorded together with its intensity. In an aspect, the intensity of a collision may be computed based on the linear kinetic energy of the opponent's joint at the time it reached (or crossed) the virtual body surface of the player. Collisions' locations and intensities may be accumulated to highlight sustained injury to the player and the level of aggression asserted by the opponent.

Figure 7:
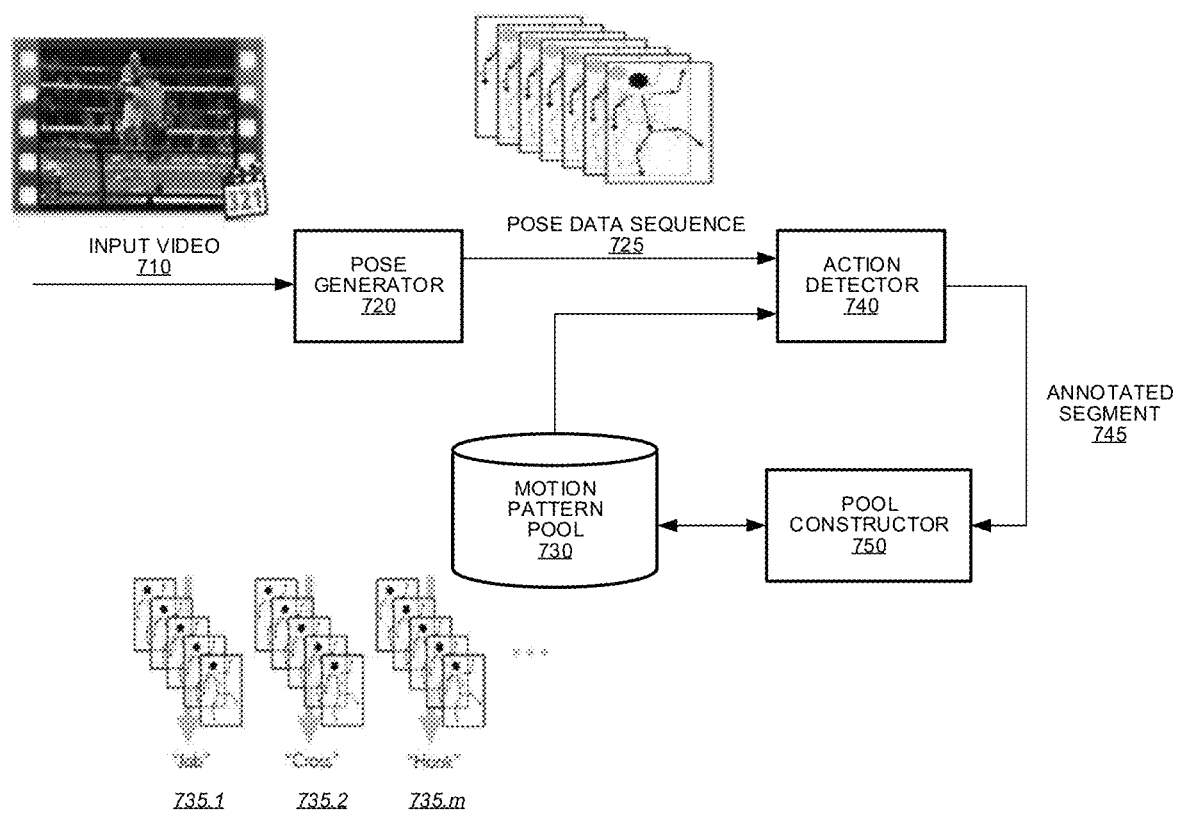
FIG. 7 illustrates a system for constructing a motion pattern pool, according to an aspect of the present disclosure.

FIG. 7 illustrates a system 700 for constructing a motion pattern pool 730, according to an aspect of the present disclosure. The pool 730 generated by the system 700 may then be used by system 100 (i.e., motion pattern pool 130) to detect actions 140 performed by players, performing in a live sporting event and to generate statistics 150 therefrom. The system 700 may comprise a pose generator 720, a motion pattern pool 730, an action detector 740, and a pool constructor 750. The pose generator 720 may receive as an input one or more video streams 110 that may be captured by respective video cameras located at a scene of the sporting event. In an aspect, the input video 710 may be a recorded video accessible from a memory storage device (e.g., a server). The pose generator 720 may output pose data sequences 725, comprising positional data of respective players (or other participants) performing (or present) at the scene of the sporting event. The action detector 740 may process segments of the received pose data sequences 125 to carry out detection of play actions represented by the segments. A detection 740 that a segment is representative of an action may be based on comparisons of the segment to motion patterns 735.1-$m$ that may be stored in the motion pattern pool 730. A segment found to be representative of an action, namely annotated segment 745, may be fed into the pool constructor 750. The pool constructor 750 may add the annotated segment 745 as a new motion pattern to the pool 730 or may discard the annotated segment if it was found to be redundant. In an aspect, the operations of the pose generator 720 and the action detector 740 may be similar to the operations of the pose generator 120 and the action detector 140, respectively, as described with respect to FIG. 1.

Figure 8:
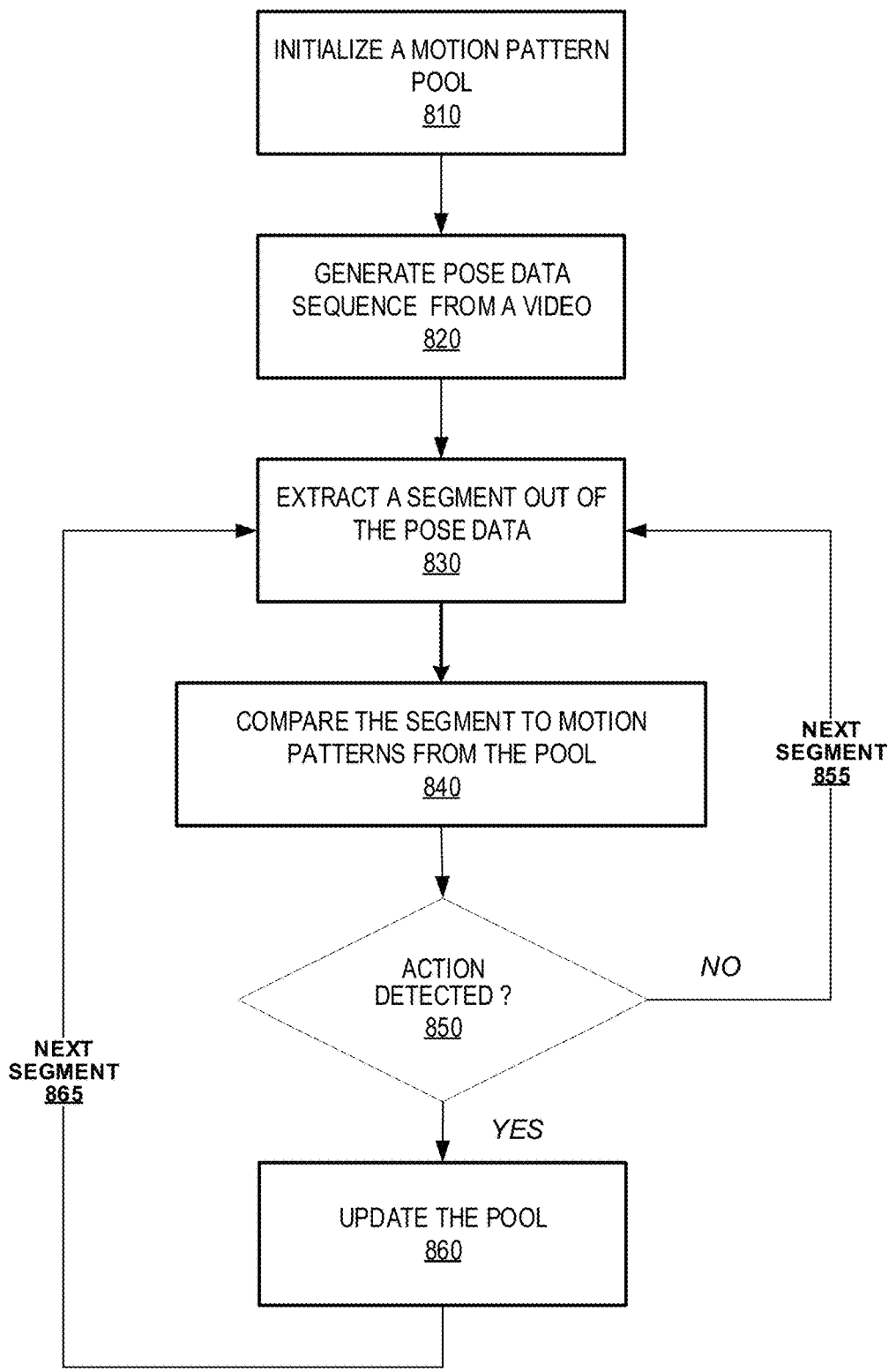
FIG. 8 illustrates a method for constructing a motion pattern pool, according to an aspect of the present disclosure.

FIG. 8 illustrates a method 800 for constructing a motion pattern pool 730, according to an aspect of the present disclosure. The method 800 may begin, in step 810, with initialization of the motion pattern pool 730. In step 820, pose data sequences 430 may be generated, each sequence may be associated with a player performing in a game 310. In step 830, a segment 440 may be extracted from a pose data sequence, wherein extraction may be within a sliding window, typically ranging between a current time and a previous time. In step 840, the extracted segment may be compared with motion patterns 735 already existing in the motion pattern pool 730. Based on the comparison, if it is detected that the segment is representative of an action 850, the segment may be considered as a motion pattern candidate to update the pool with, in step 860. Otherwise, if the segment was not detected to be representative of an action 850, a next segment 855 may be extracted from the pose data sequence 830. After step 850 of updating the pool, the method 800 may proceed with the processing of a next segment 865.

During the initialization of the motion pattern pool 810, one or more motion patterns may be selected as representative of respective actions of interest. To this end, an interactive application may be used with which a user may inspect a video of a game to detect actions of interest; the user may inspect the video of the game, may identify a video segment containing an action of interest, and may invoke a process for generating pose data out of the video segment—i.e., a motion pattern. The generated motion pattern may then be associated with the action of interest identified by the user and may be added to the pool 730. In an aspect, each motion pattern added to the pool may be associated with a data structure 950 that may contain the respective pose data and metadata. The metadata of a motion pattern may include: a motion pattern identifier, the action of interest, an identity of the player (or an event participant) that performed the action of interest, a list of events that may be associated with the action of interest, including, for example, points within the pattern motion where a contact with the opponent occurred, the side from which the event was performed (e.g., right, left, both, or none), or other game-dependent events.

In an aspect, the initial motion pattern pool may be populated 810 with motion patterns that may provide one or more examples for each action of interest. For example, in the case of a boxing match, the motion pattern pool 730 may be populated with motion patterns that may be associated with the following actions of interest: a jab, a tapper jab, a space-maker jab, a double jab, a counter jab, a cross, a hook, an uppercut, a basic guard, a low handguard, a high guard, a sit down guard, a Philly shell guard, an unknown guard, an elbow, a knee, a takedown, a short cross, a long cross, an overhand hook, a walking cross, a front hook, a long front hook, a shovel hook, an upper jab, a long jab, a back low lateral short kick, a back high lateral kick, a front middle frontal sideways kick, a back low lateral kick, a back middle lateral kick, a back low frontal sideways kick, a back low frontal kick, a back high spinning kick, a front low frontal sideways kick, a front low frontal kick, a front middle frontal sideways long kick, or a front middle frontal kick.

Once the motion pattern pool has been initialized 810, steps may be taken to build up the pool with additional motion patterns, that is, adding more motion patterns examples for the actions of interest represented in the pool, e.g., for the actions listed above. Thus, in step 820, a sequence of pose data may be generated from an input video covering a game. The input video may comprise one or more video streams provided by one or more cameras capturing the game. The input video may be recorded video streams, accessible from a memory storage device (e.g., a server), or may be provided by one or more live feeds. In step 830, a segment may be extracted from the pose data sequence 725. The segment may be extracted based on a sliding window, ranging between a current time $t_0$ and a previous time $t_0-T$, as illustrated in FIG. 2, 240 and FIG. 4, 440. The extracted segment may be compared with motion patterns from the pool 730, in step 840. Based on the comparison, it may be determined whether the extracted segment is representative of an action of interest, in step 850. If it is found that the segment is not representative of an action of interest, the next segment 855 may be extracted from the pose data sequence 725. Otherwise, if it is found that the segment is representative of an action of interest, the pool may be updated with the segment 860, as explained further below, after which the method 800 may proceed with the processing of a next segment 865. In an aspect, steps 820, 830, 840, 850 of method 800 may carry out processes that are similar to those carried out by steps 310, 320, 330, 340, of method 300, as described with respect to FIG. 3.

Figure 9:
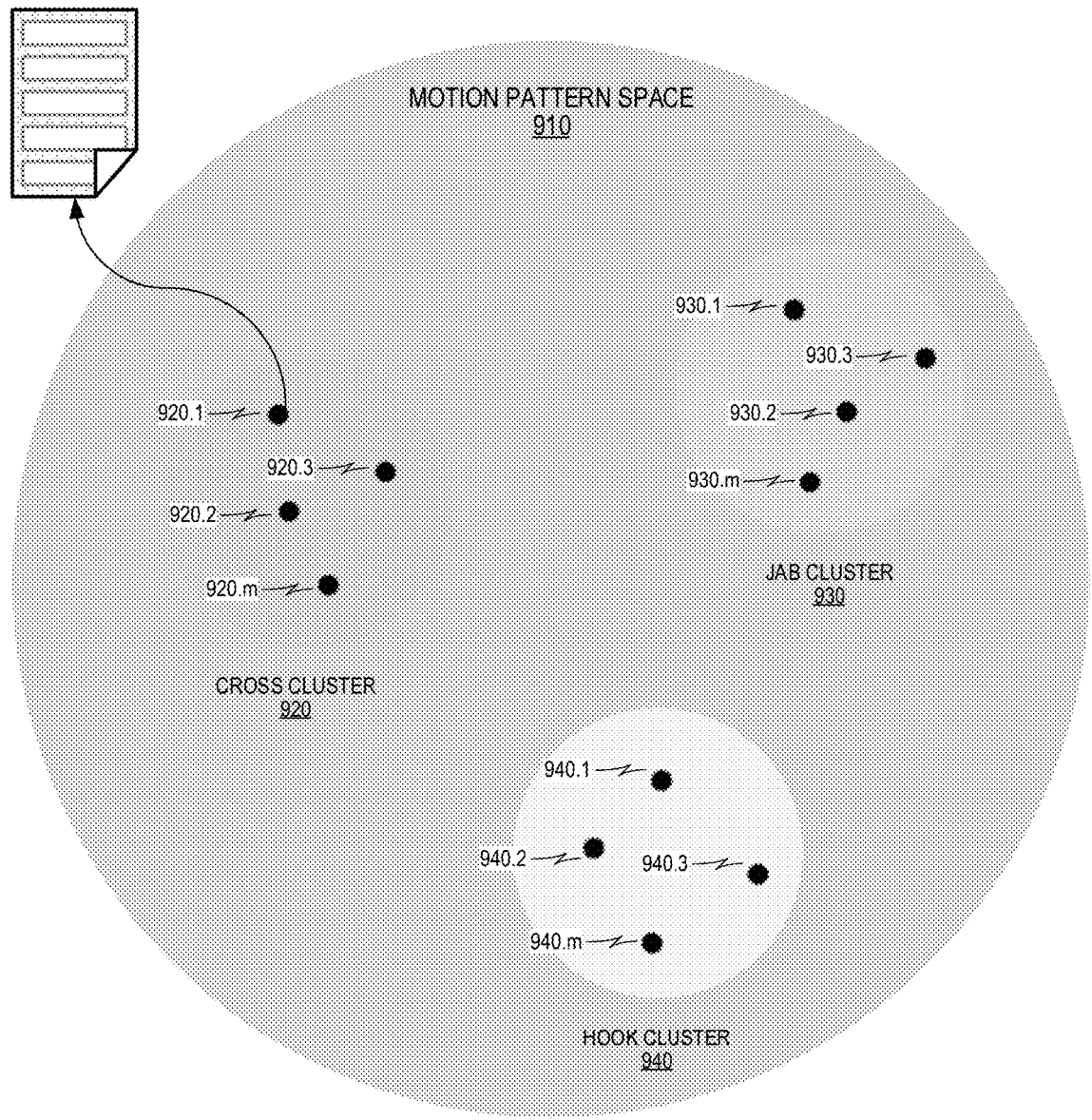
FIG. 9 illustrates a space of motion pattern clusters, according to an aspect of the present disclosure.

FIG. 9 illustrates a space of motion pattern clusters 900, according to an aspect of the present disclosure. The space of motion pattern clusters 900 further describes the motion pattern pool, illustrated in FIG. 1 and FIG. 7. A motion pattern space 900 may be populated with motion patterns, e.g., 920.1-m, 930.1-m, and 940.1-m, that may be grouped into clusters of actions of interest, e.g., a cross cluster 920, a jab cluster 930, and a hook cluster 940. Each motion pattern may be characterized by data (e.g., pose data or features derived from the pose data) that may define the motion pattern space 910. Each motion pattern may also be associated with metadata (e.g., data related to an action of interest associated with the motion pattern) contained in a data structure 950. Motion patterns that comprise similar data structures 950 tend to represent the same action of interest, and, therefore, may be clustered into the same cluster in the space of motion patterns 910. Thus, in an aspect, a pool of motion patterns may form a space 910 that may be clustered according to actions of interest. Each cluster 920, 930, or 940, in that space 910 may contain multiple motion patterns, associated with the cluster's action of interest. For example, a jab cluster 930 may have several motion patterns associated with it, e.g., 930.1-m—each representing a variant of a jab action (as a jab may be exercised differently by different players).

Hence, a pool 900 may have a number of motion patterns associated with each action cluster 920, 930, 940, to allow detection of each action when performed by various players at various instances during the game. However, too many motion patterns per an action cluster may increase the complexity of the action detection operation 330, 840. Therefore, based on the comparison of step 840, when a segment is found to match one or more motion patterns of a certain action cluster, e.g., 920, the segment may be considered as a motion pattern candidate. Then, a decision may be made whether to add this motion pattern candidate to the pool, in step 860, and, if a decision to add is made, a data structure 950 may be created for the motion pattern candidate before it may be added to the pool. In an aspect, the decision whether to add a motion pattern candidate to the pool may be based on various criteria as described below.

Ideally, motion patterns associated with one cluster (e.g., a jab cluster 930) should be spatially concentrated around the center of the cluster and sufficiently distant from motion patterns associated with another cluster (e.g., cross cluster 920). Thus, in an aspect, the motion pattern pool 900 may be updated 860 to maintain clusters that are spatially disjoint. Likewise, low density of motion patterns per cluster may be maintained to control the overall size of the pool. Hence, before adding 860 a pattern motion candidate to the pool 730, the effect on the cluster it is determined to be associated with, as well as on other clusters, may be measured. For example, the motion pattern candidate to be added to the pool as the initial motion pattern in a new cluster may not be too close to an existing motion pattern, or the motion pattern candidate to be added to an existing cluster may not be too close to other motion patterns in the cluster, otherwise it may be redundant. Moreover, the motion pattern candidate, if associated with one cluster, should not be spatially close to a neighboring cluster, otherwise it may be ambiguous. In an aspect, an assignment score that measures the consistency of a clustering process may be computed to determine whether a motion pattern candidate may be added to the pool and to what cluster.

An assignment score may be used to determine the cluster to which a motion pattern candidate may be added. In an aspect, an assignment score $SC(i)$ may be generated with respect to a cluster i and may be applied as follows. First, an average distance between the motion pattern candidate and all other motion patterns in a cluster i may be computed, denoted herein as $a(i)$. Second, the distance between the motion pattern candidate and each motion patterns from other clusters in the pool may be computed, selecting the smallest distance therefrom, denoted herein as $b(i)$. Hence, $a(i)$ may be measuring the assignability of the motion pattern candidate to a cluster i (indicating how discriminative may be the motion pattern candidate of the action represented by cluster i). On the other hand, $b(i)$ may be a measure of how far the motion pattern candidate from the closest cluster to cluster i. In an aspect, an $SC(i)$ may be a function of $a(i)$ and $b(i)$, so that $SC(i)$ increases when $a(i)$ decreases and when $b(i)$ increases. For example, $SC(i)$ may be a function of $b(i)-a(i)$. $SC(i)$ may be computed with respect to each cluster i to determine whether the motion pattern candidate may be assigned to it—the motion pattern candidate may be added to cluster i in the pool that results in the highest $SC(i)$. However, if the SC values, computed with respect to all clusters in the pool, are lower than a predetermined threshold, the motion pattern candidate may not be added to any cluster. In an aspect, a motion pattern candidate may be added to multiple clusters with a probability that is based on the value of the SC for the respective cluster.

In an aspect, an iterative process of adding new motion patterns to the motion patterns pool (as disclosed with reference to FIG. 7, 750 and FIG. 8, 860) may be employed to the real time operation of system 100 and method 300, wherein actions are detected during a live sporting event. Thus, for example, if it is determined that a segment 440 is representative of an action, in step 340 of FIG. 3, in addition to the generating of statistic based on the detected action in step 350, the method 300 may update the motion pattern pool 130 based on the segment. Accordingly, based on the comparison, in step 330, when a segment is found to match one or more motion patterns of a certain action cluster 920, 930, or 940 (FIG. 9) the segment may be considered as a motion pattern candidate. Then, a decision may be made whether to add this motion pattern candidate to the pool 130, and, if a decision to add is made, a data structure 950 may be created for the motion pattern candidate before it may be added to the pool. The decision whether to add a motion pattern candidate to the pool may be based on various criteria as described above with respect to step 860. Dynamically updating the pool of pattern motions, as described herein, may be more transparent to a user than, e.g., a system that uses a neural network. By determining the distances between a motion pattern candidate and clusters in the pool, users may determine when and why a certain action has not been detected and may use that information to help refine the system.

Figure 10:
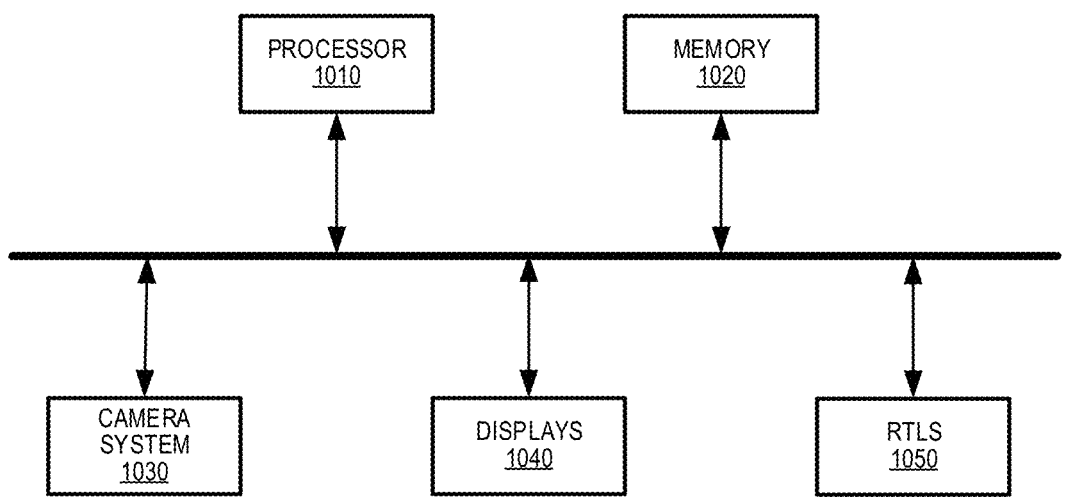
FIG. 10 is a simplified block diagram of a system, according to an aspect of the present disclosure.

FIG. 10 is a simplified block diagram of a system 1000, according to an aspect of the present disclosure. The system 1000 may comprise a processor 1010, a memory 1020, a camera system 1030, displays 1040, and an RTLS 1050. The processor 1010, the memory 1020, the camera system 1030, the displays 1040, and the RTLS 1050 may communicate with each other via communication links, including wired links, wireless links, or a combination thereof, and may be local or remote to each other. The operation of systems and methods, as illustrated in FIGS. 1-9, may be performed by the processor 1010, executing program instructions run by an operating system stored in the memory 1020. The program instructions and the operating system may be written in any programming language—such as C, Java, Objective-C, C++, Python, Visual Basic, Perl—or any other programming language capable of producing instructions that are capable of execution on the processor 1010.

The processor 1010 may include dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications to perform the methods disclosed herein.

The memory 1020 may be configured to store both programs and data. As indicated, the memory 1020 may store instructions for an operating system and applications that perform methods according to aspects of the present disclosure in machine readable form. For example, the memory 1020 may store: video data captured by the system camera 1030, pose data sequence 125, 725 that may be generated by systems 100, 700, and the motion pattern pool 130, 730, disclosed herein. The memory 1020 may also store system information, user information, and the like. The memory 1020 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions or events of a method, algorithm, or module may reside as one or any combination or set of codes or instructions on a memory 1020 or other machine readable medium, which may be incorporated into a computer program product.

The camera system 1030 may comprise static or dynamic cameras, each may be located at a site of a sporting event and each may be employed for capturing a live video of the event. The displays 1040 may present to a user a representation of the event. The representation may comprise one or more videos captured by the camera system 1030 that may be overlaid with content (e.g., graphics) derived from statistics generated from the sporting event. The RTLS 1050 may operate in corporation with sensors, attached to subjects (e.g., players) participating in the event, to produce real time positional data of the subjects. For example, pose data may be generated based on transceivers attached to a subject's body. Alternatively, or in combination, subjects' pose data may be extracted from video content generated by the camera system 1030.

The foregoing discussion has described operation of the foregoing embodiments in the context of system components, such as camera system 1030, displays 1040, and RTLS 1050. Commonly, these components may execute programs that are stored in a local memory of those components and may be executed by local processors within them. Alternatively, they may be embodied in dedicated hardware components such as application specific integrated circuits, field programmable gate arrays or digital signal processors. And, of course, these components may be provided as hybrid systems that distribute functionality across dedicated hardware components and programmed general purpose processors, as desired.

Several aspects of the disclosure are specifically illustrated or described herein. However, it will be appreciated that modifications and variations of the disclosure are covered by the above teachings and within the purview of the appended claims without departing from the spirit and intended scope of the disclosure.

We claim:

1. A method, comprising:
receiving a sequence of pose data associated with a performance of a participant in an event;
detecting, based on the sequence of pose data, one or more actions performed by the participant; and
generating, based on a kinetic energy generated by the detected one or more actions, statistics associated with the performance of the participant in the event.

2. The method of claim 1, further comprising:
generating the sequence of pose data based on an analysis of video content captured by one or more cameras positioned at a site of the event.

3. The method of claim 1, wherein the detecting comprises:
extracting a segment of pose data from the sequence of pose data;
comparing the extracted segment to one or more motion patterns, wherein each of the one or more motion patterns is associated with an action of interest; and
determining, based on a match between the extracted segment and at least one motion pattern of the one or more motion patterns, an action performed by the participant, wherein the determined action corresponds to an action of interest associated with the at least one matching motion pattern.

4. The method of claim 3, wherein each of the one or more motion patterns is associated with a data structure containing pose data, representative of an action of interest, and metadata, the metadata comprises one or more of a motion pattern identity, the action of interest, an identity of the participant that performed the action of interest, or a list of events associated with the action of interest.

5. The method of claim 3, further comprising:
updating a pool of clusters, comprising the one or more motion patterns, with a new motion pattern associated with the extracted segment, the updating comprises:
computing an assignment score with respect to each of the clusters and adding, based on the computed assignment scores, the new motion pattern to one of the clusters.

6. The method of claim 1, wherein the generating statistics comprises:

receiving a second sequence of pose data associated with a second performance of a second participant in the event; and computing a pressure statistic that measures movements of the participant toward the second participant based the sequence of pose data of the participant and the second sequence of pose data of the second participant.

7. The method of claim 1, wherein the generating statistics comprises:
computing a power statistic that measures an energy exerted by the participant, comprising computing the kinetic energy of a joint of the participant.

8. The method of claim 1, wherein the generating statistics comprises:
computing an aggressiveness statistic, derived from the kinetic energy generated by the dominant arm of the participant and the kinetic energy generated by the leading arm of the participant.

9. The method of claim 1, wherein the generating statistics comprises:
computing an aggressiveness statistic, derived from a number of the detected one or more actions and the kinetic energy associated with these actions.

10. The method of claim 1, wherein the generating statistics comprises:
for each of the detected one or more actions, determining whether a collision has occurred between the participant's body and a body of a second participant in the event; and
for each determined collision, computing a location of the collision on the second participant's body and an intensity of the collision.

11. The method of claim 10, further comprising:
computing a sustained injury on the second participant's body, based on a cumulative measure of the computed locations and intensities of the determined collisions.

12. An apparatus, comprising:
at least one processor; and
memory storing instructions that, when executed by the at least one processor, cause the apparatus to:
receive a sequence of pose data associated with a performance of a participant in an event;
detect, based on the sequence of pose data, one or more actions performed by the participant; and
generate, based on a kinetic energy generated by the detected one or more actions, statistics associated with the performance of the participant in the event.

13. The apparatus of claim 12, wherein instructions, when executed by the at least one processor, further cause the apparatus to:
generate the sequence of pose data based on an analysis of video content captured by one or more cameras positioned at a site of the event.

14. The apparatus of claim 12, wherein the instructions that, when executed by the at least one processor, cause the apparatus to detect actions comprise instructions to:
extract a segment of pose data from the sequence of pose data;
compare the extracted segment to one or more motion patterns, wherein each of the one or more motion patterns is associated with an action of interest; and
determine, based on a match between the extracted segment and at least one motion pattern of the one or more motion patterns, an action performed by the participant, wherein the determined action corresponds to an action of interest associated with the at least one matching motion pattern.

15. A non-transitory computer-readable medium comprising instructions executable by at least one processor to perform a method, the method comprising:
receiving a sequence of pose data associated with a performance of a participant in an event;
detecting, based on the sequence of pose data, one or more actions performed by the participant; and
generating, based on a kinetic energy generated by the detected one or more actions, statistics associated with the performance of the participant in the event.

16. The medium of claim 15, wherein the detecting comprises:
extracting a segment of pose data from the sequence of pose data;
comparing the extracted segment to one or more motion patterns, wherein each of the one or more motion patterns is associated with an action of interest; and
determining, based on a match between the extracted segment and at least one motion pattern of the one or more motion patterns, an action performed by the participant, wherein the determined action corresponds to an action of interest associated with the at least one matching motion pattern.

17. The medium of claim 15, wherein the generating statistics comprises:
receiving a second sequence of pose data associated with a second performance of a second participant in the event; and
computing a pressure statistic that measures movements of the participant toward the second participant based the sequence of pose data of the participant and the second sequence of pose data of the second participant.

18. The medium of claim 15, wherein the generating statistics comprises:
computing a power statistic that measures an energy exerted by the participant, comprising computing the kinetic energy of a joint of the participant.

19. A method, comprising:
receiving a sequence of pose data associated with a performance of a participant in an event;
detecting, based on the sequence of pose data, one or more actions performed by the participant, the detecting comprises:
extracting a segment of pose data from the sequence of pose data,
comparing the extracted segment to one or more motion patterns, wherein each of the one or more motion patterns is associated with an action of interest, and
determining, based on a match between the extracted segment and at least one motion pattern of the one or more motion patterns, an action performed by the participant, wherein the determined action corresponds to an action of interest associated with the at least one matching motion pattern; and
generating, based on a kinetic energy generated by the detected one or more actions, statistics associated with the performance of the participant in the event.

20. The method of claim 19, further comprising:
updating a pool of clusters, comprising the one or more motion patterns, with a new motion pattern associated with the extracted segment, the updating comprises:
computing an assignment score with respect to each of the clusters and adding, based on the computed assignment scores, the new motion pattern to one of the clusters.

* * * * *